United States Patent
Basch

(10) Patent No.: US 7,464,629 B2
(45) Date of Patent: Dec. 16, 2008

(54) LATHE TOOL

(75) Inventor: Alexandre Basch, Niederbronn-les-Bains (FR)

(73) Assignee: Societe Commerciale Rusch, Niederbronn-les-Bains (FR)

(*) Notice: Subject to any disclaimer, the term of this patent is extended or adjusted under 35 U.S.C. 154(b) by 0 days.

(21) Appl. No.: 10/591,318

(22) PCT Filed: Mar. 1, 2005

(86) PCT No.: PCT/FR2005/050135

§ 371 (c)(1), (2), (4) Date: Aug. 31, 2006

(87) PCT Pub. No.: WO2005/084856

PCT Pub. Date: Sep. 15, 2005

(65) Prior Publication Data

US 2007/0180963 A1 Aug. 9, 2007

(30) Foreign Application Priority Data

Mar. 1, 2004 (FR) .................................. 04 50402

(51) Int. Cl.
*B23B 27/10* (2006.01)
*B23B 51/08* (2006.01)

(52) U.S. Cl. ........................................ 82/117; 82/901

(58) Field of Classification Search ................. 82/117; 407/53, 57, 11; 408/56, 57
See application file for complete search history.

(56) References Cited

U.S. PATENT DOCUMENTS

| 2,429,375 | A | * | 10/1947 | Smith .......................... 279/102 |
| 2,470,218 | A | * | 5/1949 | McNamara .................. 279/20 |
| 3,460,410 | A | | 8/1969 | Franklin |
| 5,085,540 | A | * | 2/1992 | Pagliaccio .................... 407/11 |
| 6,200,073 | B1 | * | 3/2001 | Chung .......................... 407/53 |
| 2002/0094245 | A1 | | 7/2002 | Melcher et al. |

FOREIGN PATENT DOCUMENTS

| DE | 201 06 205 | 7/2002 |
| EP | 0 579 371 | 1/1994 |

\* cited by examiner

*Primary Examiner*—Willmon Fridie
(74) *Attorney, Agent, or Firm*—Young & Thompson

(57) ABSTRACT

A one-piece lathe tool for boring with a cross-section of less than 10 mm, includes an essentially-cylindrical tool body intended to be inserted and held in a tool support which is traversed by at least one lubricant supply channel. One end of the tool body extends into a neck which terminates in a head that forms the active part of the tool. In order to ensure good lubrication, the neck is offset in relation to the axis of the tool body, while, at the end of the neck, the head is offset in relation to the axis. The head, together with the cutting edge thereof, falls within and is essentially tangent to the periphery of a cylindrical space corresponding to the extension of the tool body. A machining assembly including such a one-piece lathe tool and a tool support are also disclosed.

13 Claims, 1 Drawing Sheet

LATHE TOOL

The invention relates to a lathe tool of the single piece type for boring with a cross-section less than 10 mm, comprising a substantially cylindrical tool body provided to be engaged and held in a tool support traversed by at least one lubricant supply channel, this tool body being prolonged, at one end, by a neck terminating in a head comprising a cutting edge and constituting the active part of the tool.

The present invention will find its application in the field of tools for machining, more particularly that of lathe tools of the single piece type, in contrast to tools of which in particular the cutting edge is defined by a piece connected to the neck of the tool by welding, soldering, or any other mechanical securement.

In this connection, the invention relates to lathe tools for boring with a cross-section less than 10 mm.

There are already known numerous lathe tools fitting the above description and comprising a tool body provided to be engaged and held in a tool support with which are associated gripping means for said lathe tool, as well as lubricant supply means.

The lifetime of the tool, more particularly its active portion which constitutes a head at the end of a neck prolonging the tool body, depends most often on the quality of lubrication.

More precisely, in the case of precision machining, for example, a tool of reduced diameter or else during the production of such a bore of small cross-section, either of a neck or of a screw thread, there are encountered numerous difficulties for suitably supplying the lubricant to the machining region.

Thus, taking the case of known lathe tools comprising a head of a cross-section at most equal to the tool body and substantially centered on the longitudinal axis of this latter, the lubricating fluid, when it is supplied through the tool support, has difficulty reaching the active machining portion.

In particular, the lubricating fluid, supplied through the tool support, is necessarily beyond this latter at a distance from the axis of the tool body corresponding at least to the radius of this latter. However, when the lathe tool head is of a cross-section less than that of the tool body, its active portion, namely its cutting edge is itself located at a distance from this axis of the tool body which is less than the radius of this latter. To sum it up, this active portion of the tool is not located in the direct prolongation of the lubricant flow.

Also, this lubricant flow can be simply projected against the front surface of the piece undergoing boring, for example.

To bring the lubricant flow to the axis of this tool body, whose cross-section is greater than that of the head, it has been proposed to machine a groove in the periphery of the tool body or else to pierce this latter with a channel. Thus, the lubricant will be directly brought through the lathe tool.

Clearly, this groove and/or these bores in the tool body require a special construction of the lathe tool during its design. In other words, it is a matter of an additional machining operation which represents a substantial increase in the cost of production.

In certain cases, it has also been proposed to provide the tool with a particular cross-section to permit it to be traversed by a lubricant supply channel.

There again, by departing from a substantially cylindrical shape of the tool body to obtain a more specific profile, there results a higher cost of production.

To solve this lubrication problem, it has been thought to adapt the cross-section of the tool body to that of the head. For example, for a boring tool, comprising a head substantially matched to the cross-section of the bore to be produced, the body of this tool is itself adapted to this boring cross-section.

Whilst passing through the tool support, the lubricant can be immediately atomized at the periphery of the tool body, namely substantially in prolongation of the cutting edge of the tool head whose section is identical.

Clearly, in this case, the user must have as many tool supports as there are tool bodies of different cross-sections.

Finally, the present invention has sought to provide a solution to the mentioned problem. By means of it, it is possible to provide a lathe tool whose cost of production is not burdened by additional machining for the design of a groove or a channel for supplying lubricating fluid. Moreover, the body of this tool can be selected to be of standard cross-section. In particular, its cross-section is not necessarily adjusted to the head of the tool to ensure perfect lubrication of this latter.

Thus, the invention relates first of all to a lathe tool of the single piece type for boring a cross-section less than 10 mm, comprising a substantially cylindrical tool body provided to be engaged and held in a tool support traversed by at least one lubricant supply channel, this tool body being prolonged, at one end, by a neck terminating in a head comprising a cutting edge and constituting the active portion of the tool. More particularly, and for the same of lubrication, the neck is eccentric relative to the axis of the tool body, whilst the head, at the end of this neck, is itself eccentric relative to this axis, said head, with its cutting edge, being inscribed and substantially tangent to the periphery of a cylindrical space corresponding to the prolongation of said tool body.

The invention also relates to a machining assembly comprising a lathe tool of the single piece type for boring with a cross-section less than 10 mm and a tool support comprising, at one forward end, a recess suitable for the reception of the lathe tool body, as well as gripping means for holding this latter in said recess, this tool support being also traversed by at least one lubricant supply channel, characterized by the fact that said channel opens at the forward end of the tool support at the periphery of the recess for reception of the tool body, which is prolonged by a neck eccentric to the axis of this tool body and terminating in a head comprising a cutting edge constituting the active portion of the tool, this head being itself eccentric relative to this axis, said head, with its cutting edge, being inscribed in and substantially tangent to the periphery of a cylindrical space corresponding to the prolongation of said tool body.

Thus, for the purpose of lubrication, this cutting edge is substantially tangent to the cylindrical space corresponding to the prolongation of the tool body. Because of this, this cutting edge is located in the immediate prolongation of the flow of lubricant at the outlet of the end of the tool support.

The present invention will be better understood from a reading of the description which follows, with reference to the accompanying drawing, showing one embodiment.

Figure 1:
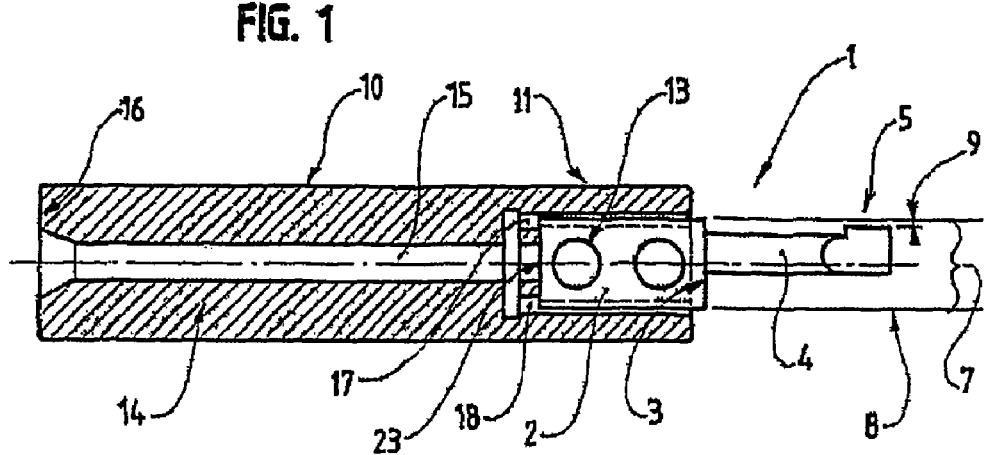
FIG. 1 is a schematic representation in longitudinal cross-section of a tool support according to the invention and receiving a lathe tool, here again designed according to the invention.

According to the figures of the accompanying drawing, the present invention relates to the field of lathe tools of the single piece type for boring with a cross-section less than 10 mm.

Such a lathe tool 1 comprises a substantially cylindrical tool body 2 and is prolonged, at one end 3 by a neck 4. This latter terminates in a head 5 having a cutting edge constituting the active portion of the lathe tool 1.

Thus, by single piece, is meant that the tool body 2, its neck 4 and its head 5, with its cutting edge, form only a single piece made from the same material.

More particularly and according to the invention, the neck 4 and the head 5 of the tool 1 at the end of this neck 4 are eccentric relative to the axis of the tool body 2. However, said head 5 remains inscribed in a cylindrical space 7 defined in prolongation of the tool body 2.

Importantly, for the purpose of lubrication, this head 5 with its cutting edge 6, whilst satisfying the above condition, is substantially tangent to the periphery 8 of this cylindrical space 7.

Thus, it is slightly spaced inwardly for a distance 9 of at least a hundredth of a millimeter.

It will be clearly seen that by atomizing the lubricant axially in this manner and tangentially to the tool body 2, as is illustrated schematically in FIG. 1, this lubricant can directly reach the tool head 5.

Returning to the tool support 10, it comprises, at one forward end 11, a recess 12 suitable for the reception of the tool body 2, with this recess 12 communicating with gripping means 13 shown by the two circles in FIG. 1.

Such gripping means 13, for example screws, are provided to hold the lathe tool 1 perfectly in the tool support 10 in the course of machining.

It will moreover be noted that indexing means are provided to ensure the proper angular positioning of the body 2 of the tool 1 in the tool support 10. Thus, there is sought a good repetivity of the positioning of the active portion, at the cutting head of the center for example, hence of the positioning of the cutting edge of the tool 1, on which depends the precision of ultimate machining. The suitable positioning also permits good wetting of the edge of the tool by the lubricant.

According to the invention, these indexing means are defined, on the one hand, by said gripping means 13 and, on the other hand, by at least one flat on the periphery of the tool body 2. Thus, at the time of gripping by the screws against said flat, there results an angular repositioning of the tool 1 in the tool support 10.

This latter is also traversed by at least one lubricant supply channel 14, the channel 14 opening at the forward end 11 of this tool support 10 at the periphery of the recess 12 for reception of the tool body 2.

Figure 3:
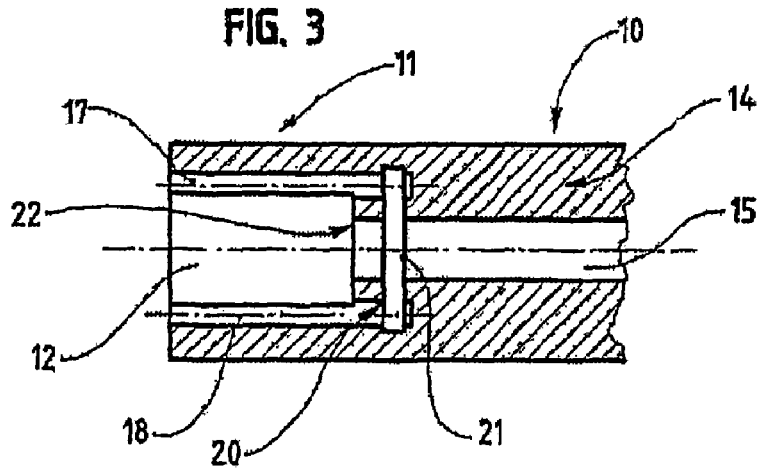
FIG. 3 is a schematic representation in longitudinal cross-section of the tool support.

As is seen in FIGS. 1 and 3, the lubricant supply channel 14 comprises a principal section 15 communicating with lubricant supply means at the rear end 16 of the tool support 10. It is connected moreover to at least one atomizing channel 17, 18 extending at the periphery of the recess 12 and tangentially to the tool body 2.

According to the invention, the spray channel or channels 17, 18 communicate with this recess 12.

Figure 2:
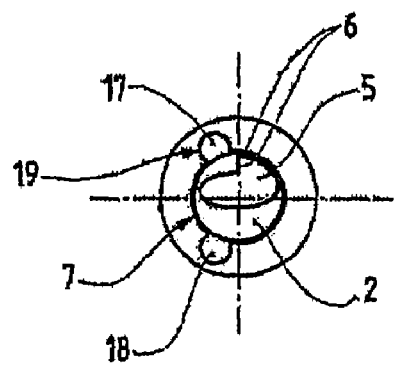
FIG. 2 is a schematic representation from the right of FIG. 1.

They can be made by axial piercings 19, as seen in FIG. 2, or quite simply by longitudinal grooves extending along the wall internal to the recess 12.

The principal section 15 of the lubricant supply channel 14 extends, in the illustrated embodiment, axially along the tool support 10, the communication with the spray channels 17, 18 taking place through a circular throat 21, at the rear of the recess 12 for reception of the lathe tool.

In a particularly advantageous manner, in the bottom of the recess 12 is provided a reference seat 22 on which will come into abutment the rear end 23 of the tool body 2, guaranteeing the axial positioning of this latter in said tool support 10.

It is to be noted that the tool support 10 and the lathe tool 1 preferably comprise indexing means for the angular positioning of this latter in the recess 12. As to the spray channels 17, 18, they are implanted in the periphery of the recess 12 so as to spray the lubricant substantially in front of the cutting edge 6 of head 5. Thus, this implantation of the spray channels 17, 18 depends on the working direction of the lathe tool, to the right or to the left.

The invention claimed is:

1. Lathe tool of the single piece type for boring with a cross-section less than 10 mm, comprising:
   a substantially cylindrical tool body (2) provided to be engaged and held in a tool support (10) traversed by at least one lubricant supply channel, the tool body (2) prolonged, at one end (3), by a neck (4) terminating in a head (5) comprising a cutting edge (6) and constituting the active portion of the tool (1), wherein,
   the neck (4) is eccentric relative to the axis of the tool body (2),
   the head (5), at the end of this neck (4), is eccentric relative to the axis, and
   the head (5) and the cutting edge (6) are inscribed in and substantially tangent to a periphery (8) of a cylindrical space (7) corresponding to the prolongation of said tool body (2) such that the cutting edge is located in an immediate prolongation of a flow of lubricant at an outlet at the one end of the tool support.

2. Lathe tool according to claim 1, wherein the head (5) is located back at least a hundredth of a millimeter from the periphery (8) of the cylindrical space (7).

3. Machining assembly, comprising:
   a lathe tool (1) of the single piece type for boring with a cros-ssection less than 10 mm;
   a tool support (10) comprising a recess (12) at one forward end (11) suitable for the reception of the body (2) of the lathe tool (1), and gripping means (13) for holding the lathe tool (1) in said recess (12), the tool support (10) being traversed by at least one lubricant supply channel (14),
   wherein said channel (14) has an opening at the one forward end (11) of the tool support (10) at a periphery of the recess (12) for reception of the tool body (2),
   wherein the tool body (2) is prolonged by a neck (4) eccentric to an axis of the tool body and terminating in a head (5) comprising a cutting edge (6) constituting the active portion of the tool (1),
   wherein the head (5) is eccentric to the axis, and
   wherein the head (5) and the cutting edge (6) are inscribed in and substantially tangent to the periphery (8) of a cylindrical space (7) corresponding to the prolongation of said tool body (2) such that the cutting edge is located in an immediate prolongation of a flow of lubricant through the opening of said channel (14) at the one forward end of the tool support.

4. Machining assembly according to claim 3, wherein the lubricant supply channel (14) comprises a principal section (15) communicating with lubricant supply means at the rear end (16) of the tool support (10) and connected to at least one spray channel (17, 18) extending tangentially to the tool body (2) in the recess (12).

5. Machining assembly according to claim 4, wherein the spray channel or channels (17, 18) communicate with the recess (12).

6. Machining assembly according to claim 4, wherein the spray channel or channels (17, 18) are constituted by axial piercings (19).

7. Machining assembly according to claim 5, wherein the principal section (15) of the lubricant supply channel (14)

communicates with the spray channels (17, 18) through a circular throat (21), at the rear of the recess (12) for reception of the lathe tool (1).

8. Machining assembly according to claim 3, wherein the spray channel or channels (17, 18) are implanted in the periphery of the recess (12), substantially before the cutting edge (6) of the head (5) as a function of the working direction of the lathe tool (1).

9. Machining assembly according to claim 3, wherein in the bottom of the recess (12) is provided a reference seat (22) for the lathe tool (1).

10. Machining assembly according to claim 3, further comprising:
   indexing means for the angular position of the body (2) of the tool (1) in the tool support (10).

11. Machining assembly according to claim 10, wherein the indexing means are defined, on the one hand, by the gripping means (13) and, on the other hand, by at least one flat on the periphery of the tool body (2) with which said gripping means (13) are adapted to coact.

12. Lathe tool according to claim 1, wherein the outlet at the one end of the tool support comprises one or more spray channels (17, 18) configured to spray the lubricant substantially in front of the cutting edge (6) of the head (5).

13. Machining assembly according to claim 3, wherein the opening of said channel (14) comprises one or more spray channels (17, 18), in communication with the lubricant supply channel (14) and implanted in a periphery of the recess (12) such that the lubricant is sprayed substantially in front of the cutting edge (6) of the head (5).

* * * * *